United States Patent [19]

Erskine

[11] Patent Number: 5,339,763

[45] Date of Patent: Aug. 23, 1994

[54] FASTENER FOR A BOAT COVER

[75] Inventor: Edward J. Erskine, Benson, N.Y.

[73] Assignee: Nelson A. Taylor Co., Inc., Gloversville, N.Y.

[21] Appl. No.: 13,091

[22] Filed: Feb. 3, 1993

[51] Int. Cl.$^5$ ............................................. B63B 17/00
[52] U.S. Cl. ...................................... 114/361; 24/682; 24/686
[58] Field of Search ................. 114/361; 135/119; 24/588, 682, 686, 696; 296/100, 93

[56] References Cited

U.S. PATENT DOCUMENTS

| | | | |
|---|---|---|---|
| 2,937,652 | 5/1960 | Zimmer, Jr. et al. | 135/6 |
| 2,961,725 | 11/1960 | McGee | 24/73 |
| 3,016,548 | 1/1962 | Taylor | 114/361 |
| 3,172,419 | 3/1965 | Lewis | 114/361 |
| 3,192,542 | 7/1965 | Mills, II | 114/361 |
| 3,367,349 | 2/1968 | O'Link | 135/6 |
| 3,533,890 | 10/1970 | Nesbit | 161/16 |
| 4,287,657 | 9/1981 | Andre et al. | 29/450 |
| 4,692,969 | 9/1987 | Johnson | 24/573 |
| 4,730,866 | 3/1988 | Nett | 296/100 |
| 4,838,602 | 6/1989 | Nett | 296/100 |
| 4,850,640 | 7/1989 | Gold | 296/201 |
| 4,986,594 | 1/1991 | Gold et al. | 296/201 |

Primary Examiner—Sherman Basinger
Attorney, Agent, or Firm—Nixon & Vanderhye

[57] ABSTRACT

A fastener clip is provided for use with a boat windshield assembly which includes at least one trim piece extending along an upper edge of the glass or other transparent material, an elongated gasket secured within the trim piece and enclosing the upper edge of the glass. The fastener clip includes a pair of obliquely angled leg portions, one of which mounts a male snap fastener component, and the other of which is wedged between the glass and the gasket in such a way that the fastener clip does not engage the trim piece.

20 Claims, 3 Drawing Sheets

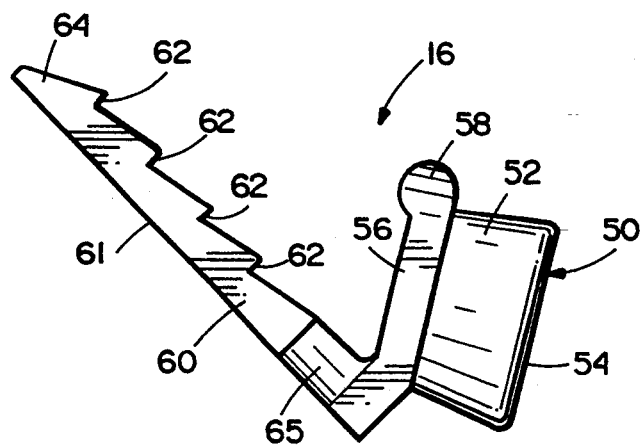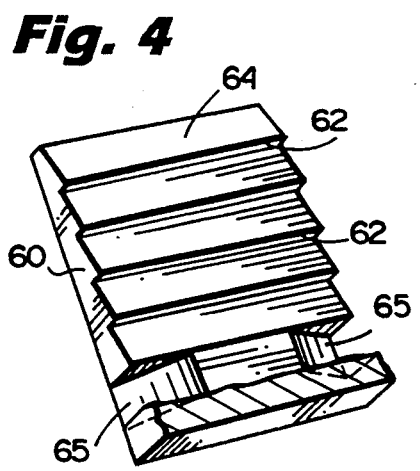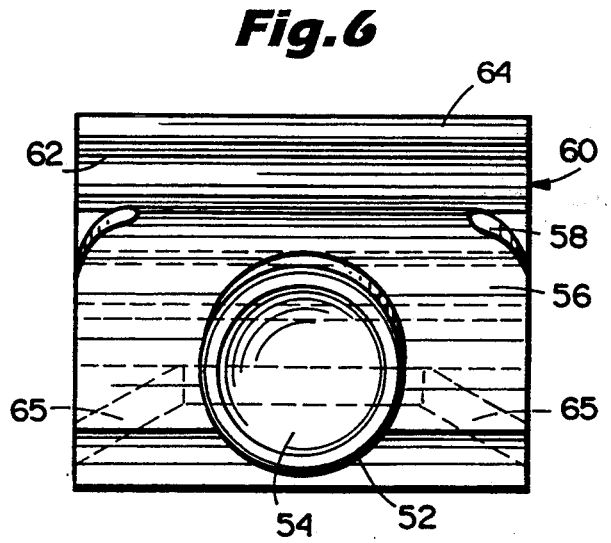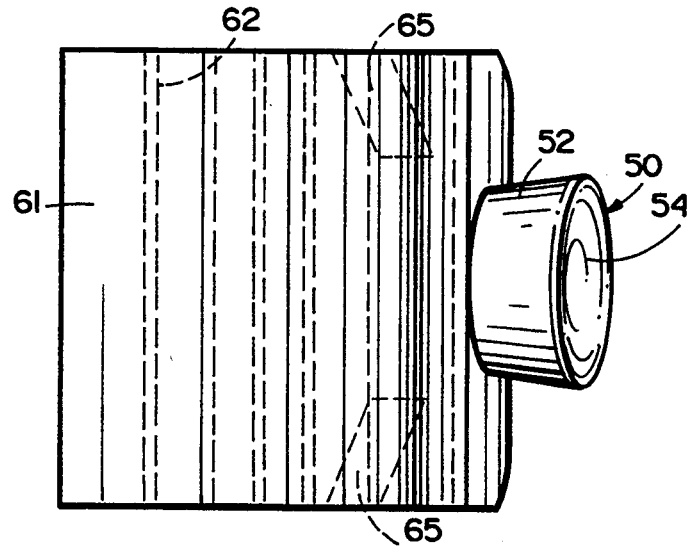

FASTENER FOR A BOAT COVER

BACKGROUND AND SUMMARY OF THE INVENTION

This invention relates generally to fasteners for attaching canopies of fabric coverings to objects or vehicles which are to be protected from wear or from inclement weather. More specifically, the invention relates to fastener clips for attachment to the exposed edge of a boat windshield by which a flexible top or removable cover may be secured to the windshield.

As is well known, many pleasure boats today have windshields that project upwardly from the gunwales and front deck of the boat. The exposed edges of the windshield are typically comprised of a protective trim usually of vinyl, aluminum or stainless steel construction. Most boats of this type also have flexible tops or removable covers to protect the boat when it is not in use or during inclement weather. These covers or tops are typically formed of a flexible material such as canvas or other waterproof fabric, and are fastened to the exposed edge of the windshield by conventional fastener means. In many windshield constructions, fasteners are attached directly to the windshield trim at spaced locations along the upper edge of the windshield. Each fastener clip mounts a conventional fastener, such as a male snap fastener component, that is designed to mate with a corresponding female component that is affixed to the flexible top or removable cover.

The patent literature contains many examples of fastener clips which are adapted for securement to the trim pieces of the exposed edge of a boat windshield. In U.S. Pat. No. 4,692,969, for example, a windshield attachment clip mounting a snap fastener is disclosed which has a generally inverted U-shape which simply snaps over the trim piece. The snap fastener component is secured to an extended leg portion of the clip.

In U.S. Pat. No. 3,367,349, conventional snap buttons are attached to a boat windshield trim piece with inwardly turned legs of a web portion of an associated clip which is apparently secured within spaced grooves formed in the trim piece.

In U.S. Pat. No. 2,961,725, boat windshield clips are disclosed which include right angled strap portions which fit over the windshield trim piece, one of the strap portions mounting a conventional, snap fastener component.

In U.S. Pat. No. 2,937,652, spring clips are disclosed which are designed to snap over the outer face of the windshield trim strip. Each spring clip mounts a conventional male snap fastener component.

In each of the above described arrangements, the fastener clips are designed for attachment directly to the trim piece or strip which covers the exposed edge of the boat windshield. As such, the fastener clips present a cluttered and unsightly appearance which otherwise detracts from the smooth, stream-lined design of the windshield.

It is the principal object of the present invention, therefore, to provide a unique fastener clip which does not attach directly to the windshield trim piece so that a smooth, uninterrupted surface along the entire length of the trim piece is achieved. To this end, the fastener clips in accordance with this invention are attached along a gasket which is interposed between the trim piece and the glass or other transparent material. In addition, the fastener clips in accordance with this invention are constructed of black material which blends with the black material of the gasket so that the fastener clips are virtually unnoticeable.

In accordance with a first exemplary embodiment of the invention, a fastener clip is provided wherein a conventional male snap fastener component is supported on a relatively flat base portion which intersects a fastening leg portion at an oblique angle. In other words, the fastener clip is generally V-shaped, with one, shorter leg of the V-shaped clip mounting a conventional male snap fastener component. The longer leg portion of the fastener clip is adapted to be wedged under the gasket so that an exterior, smooth surface portion of the connecting leg lies flush with the glass surface, and an interior serrated surface portion of the longer leg is embedded within the gasket material. In use, the male fastener component is oriented substantially parallel to the windshield angle.

In a second and preferred embodiment of the invention, the male snap fastener component is oriented at a substantially horizontal angle which facilitates the securement of the flexible top or removable cover to the exposed edge of the otherwise slanted windshield.

Accordingly, in its broader aspects, the present invention provides a fastener clip comprising a pair of leg portions arranged in a substantially V-shape, one of the pair of leg portions having a length greater than the other of the pair of leg portions, the other of the leg portions supporting a fastener component projecting away from the first of the leg portions.

In another aspect, the present invention provides a boat windshield assembly comprising acrylic, glass or other transparent material; at east one trim piece extending along an upper edge of the glass; an elongated gasket secured within the trim piece and enclosing the upper edge of the glass; and at least one fastener clip having a pair of mounting legs arranged obliquely relative to each other, the mounting legs engaging only the gasket and the glass.

In still another aspect, the present invention provides a boat windshield assembly comprising a glass or other transparent material; at least one trim piece extending along an upper edge of the glass; an elongated gasket secured within the trim piece and enclosing the upper edge of the glass; and at least one fastener clip secured to the windshield assembly along the gasket material between the glass and the trim piece, the fastener clip having an exposed portion which nowhere engages the trim piece, and wherein the exposed portion supports a male snap fastener component.

Additional objects and advantages of the present invention will become apparent from the detailed description which follows.

BRIEF DESCRIPTION OF THE DRAWINGS

FIG. 4 is a partial perspective view of the snap fastener clip shown in FIG. 3;

FIG. 5 is a side view of the snap fastener clip shown in FIG. 3;

FIG. 6 is a front elevation of the snap fastener clip illustrated in FIG. 5;

FIG. 7 is a bottom view of the snap fastener clip construction illustrated in FIG. 5;

DETAILED DESCRIPTION OF THE DRAWINGS

Figure 1:
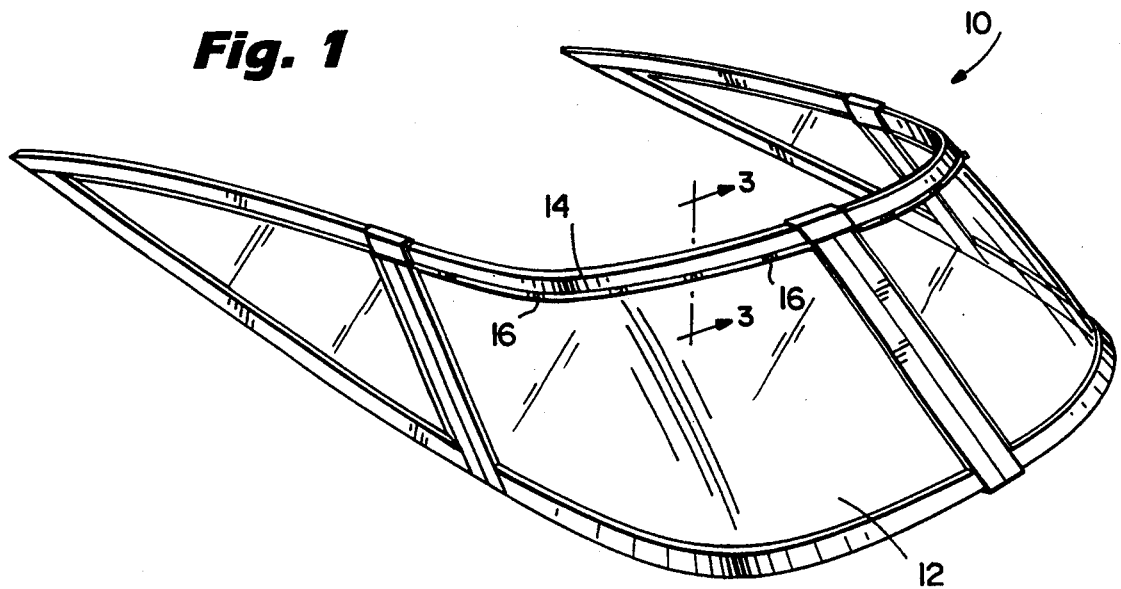
FIG. 1 is a perspective view of a boat windshield assembly incorporating a snap fastener clip in accordance with this invention.

With reference to FIG. 1, a boat windshield assembly 10 includes various trim pieces (typically constructed of vinyl, aluminum or stainless steel), which are attached to the edges of the glass or other transparent material 12. An upper windshield edge trim piece 14 is shown with associated snap fastener clips 16 in accordance with a first exemplary embodiment of the invention. As discussed above, the snap fastener clips are typically used to secure a flexible top or removable cover (e.g., a canvas tarp or the like) over the otherwise open seating area.

Figure 2:
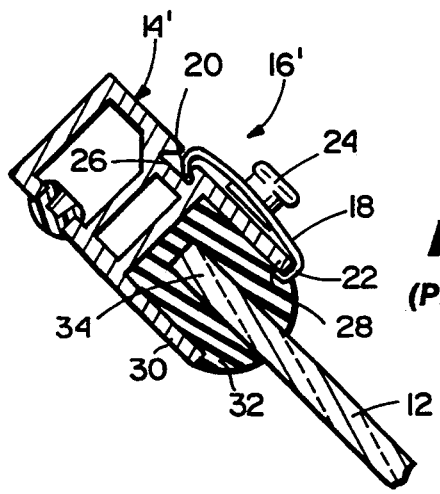
FIG. 2 is a partial cross sectional view of an upper windshield trim piece having a known snap fastener clip attached thereto.

In prior art constructions, such as that shown in FIG. 2, the trim piece 14' has fixed thereto along its length, a plurality of snap fastener clips 16'. Each clip 16' includes a relatively flat base portion 18 and a pair of inwardly turned flanges 20 and 22 as well as an integral male snap fastener 24 secured generally in the middle of the base portion 18 by any suitable means such as riveting or the like. The inwardly turned flange 20 is seated within a dovetail-like groove 26 formed in the trim piece 14', while the opposite inwardly turned flange 22 is secured about the edge of a flange portion 28 of the same trim piece. A laterally spaced flange portion 30, in combination with flange portion 28, define a space for receiving a generally inverted U-shaped gasket 32 (constructed of conventional gasket material) which sandwiches and seals the edge portion 34 of the glass 12. As can be seen in FIG. 2, the upper edge 34 of the glass along with the gasket 32 are slidably received within the space defined by the flange portions 28 and 30 of the trim piece 14'.

As will be appreciated from FIG. 2, a series of such clips 16' arranged along the windshield presents an unsightly appearance which detracts from the otherwise streamlined look of the windshield assembly as a whole.

Figure 3:
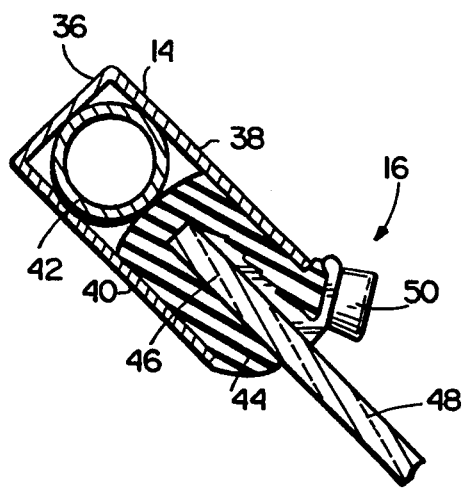
FIG. 3 is a partial cross sectional view taken along the line 3—3 of FIG. 1 and illustrating the snap fastener clip construction in accordance with this invention.

Turning to FIG. 3, a windshield assembly in accordance with a first exemplary embodiment of this invention is shown to include a trim piece 14 and associated snap fastener clip 16 of the type illustrated in FIG. 1. More specifically, the trim piece 14 is a channel-shaped member including a base portion 36 and a pair of flange portions 38 and 40 which extend in substantially parallel but laterally spaced relationship away from the base portion 36. A tubular trim piece 42 extends within the trim piece 14, adjacent the base portion 36, leaving sufficient space to receive the generally inverted U-shaped gasket 44 which, in turn, seals the upper edge 46 of the glass 48 within the trim piece 14.

The fastener clip 16 in accordance with a first exemplary embodiment of the invention, and as best seen in FIGS. 4–7, includes an integral male snap fastener component 50 which, in itself, is of conventional shape including a slightly tapered circular side wall portion 52 and a relatively flat top wall portion 54 which is adapted to receive a female socket, also of the conventional type. The snap fastener 50 is supported on a relatively flat base or leg portion 56 which has an enlarged curled edge 58 at one free end thereof. The opposite end of this first leg portion 56, is connected to an obliquely angled second leg portion 60 having a length greater than the length of the first leg portion 56, and provided on its inside surface with a plurality of serrations 62. The free end of leg portion 60 has a generally tapered edge 64 to facilitate insertion in the manner described below.

Returning to FIG. 3, the fastener clip 16 in accordance with this invention may be attached to the windshield assembly 10 by pushing the longer leg portion 60 between the gasket 44 and the glass such that the smooth or flat exterior surface 61 of the leg portion 60 lies flush against the glass 48, while serrations 62 formed on the inside surface of the leg portion are effectively embedded within the gasket 44. Insertion of the clip 16 is complete when the forward edge of the gasket abuts the back surface of the leg portion 56. Ramp surfaces 65 allow the edge of the gasket to lie flat on the glass.

The snap fastener clip 16 in accordance with this invention is preferably constructed of a suitable thermoplastic material such as Delrin TM which may have a black color, substantially the same color as the gasket 44. In this way, it will be appreciated that the plurality of fastener clips 16 located along the top edge of the windshield 12 are substantially unnoticeable as compared to the stainless steel clip arrangement illustrated in FIG. 2. The trim piece 14 also has a clean, uncluttered appearance since the surface of the outside flange portion 38 is uninterrupted along its entire length. With reference again to FIG. 3, the male snap fastener component 16 projects slightly downwardly, relative to horizontal, when in a use orientation as shown in FIG. 3.

Figure 8:
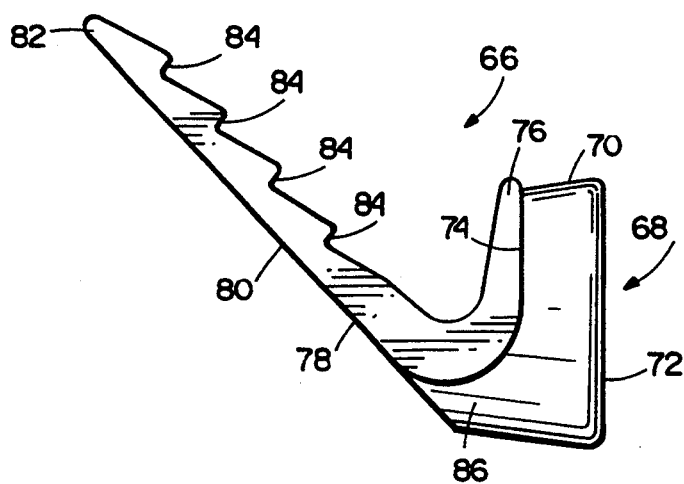
FIG. 8 is a side view of a snap fastener clip construction in accordance with another exemplary embodiment of the invention.
Figure 9:
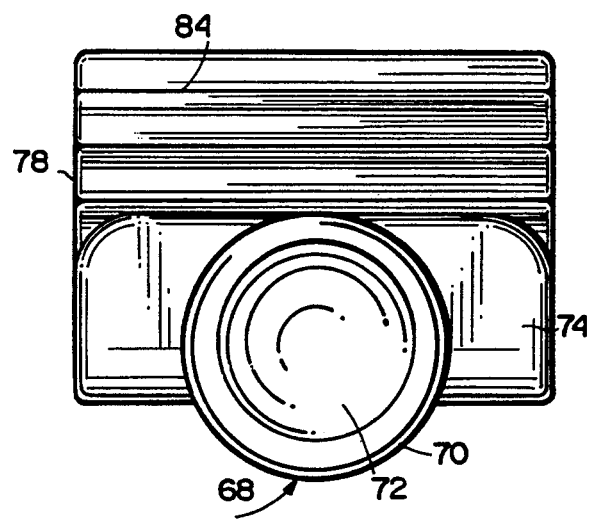
FIG. 9 is a front elevation of the snap fastener clip illustrated in FIG. 8.
Figure 10:
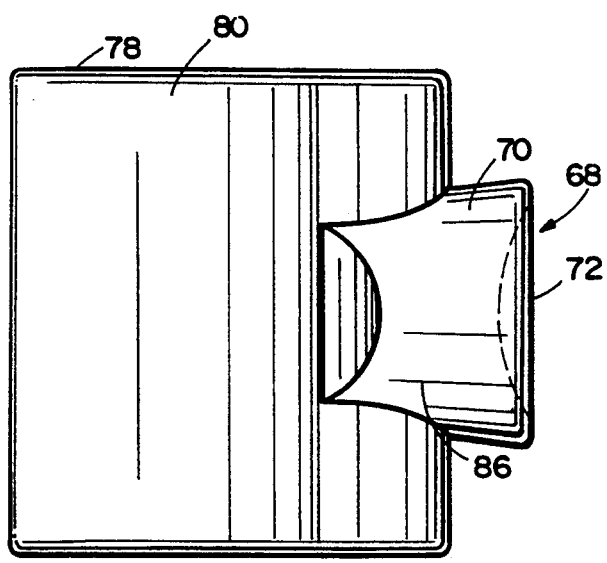
FIG. 10 is a bottom plan of the snap fastener clip construction illustrated in FIG. 8.

Turning now to FIGS. 8–10, a fastener clip in accordance with another and preferred exemplary embodiment of the invention is shown at 66.

The clip 66, having overall dimensions similar to the previously described fastener, mounts an integral male snap fastener component 68 which includes an annular side wall portion 70 and a flat top wall portion 72, and which is adapted to receive a female socket component (not shown) of a generally conventional type. The snap fastener 68 is supported in part on a relatively flat base or leg portion 74, the free end of which is tapered as at 76. The opposite end of the base or leg portion 74 merges with an obliquely angled leg portion 78 which has a length significantly greater than the length of the leg portion 74. The angled leg portion 78 has a substantially smooth, flat exterior surface 80 terminating at a generally tapered free edge portion 82. The interior surface of the leg portion 78 is provided with a plurality of substantially parallel serrations 84. Leg portions 74 and 78 in this preferred embodiment are separated by an angle of about 45° which enables the male snap fastener to be oriented as described below.

The male snap fastener component 68 is supported not only on the relatively flat part of the leg portion 74, but it also bridges the interface between the leg portion 74 and the leg portion 78 in an area designated by reference numeral 86. This arrangement orients the male snap fastener component 68 substantially perpendicularly to a vertical line when the fastener clip is in place on the boat windshield. Stated otherwise, the male fastener component extends substantially horizontally away from the windshield. As a result, the flexible top or cover is more easily snapped into place over the male snap fastener components than with the previously described embodiment.

Also as in the previously described embodiment, the snap fastener clip is preferably constructed of Delrin ™ material, in the same color as the gasket 44.

It will be appreciated that the fastener clip in accordance with this invention is equally applicable for use with other fastening devices, i.e., other than conventional snap type fasteners. In other words, the snap-on type fastener per se is merely exemplary of many possible fastener arrangements which could be used in combination with the fastener clip construction of this invention. Moreover, it is equally apparent that the fastener clip in accordance with this invention may be used in conjunction with other structures or vehicles where gasket material is inserted between the trim piece and an associated glass panel, thereby providing the opportunity for attachment of the fastener clip in an unobtrusive fashion.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A thermoplastic fastener clip for use with a windshield assembly which includes a transparent member, a trim piece extending along an edge of the transparent member, and a gasket secured within the trim piece and enclosing said edge of said transparent member, said fastener clip comprising a pair of leg portions arranged in a substantial V-shape, one of said pair of leg portions having a length greater than the other of said pair of leg portions, the other of said leg portions supporting a fastener component projecting away from said one of said leg portions, and wherein said one leg portion is formed with opposed interior and exterior surfaces, said exterior surface being substantially flat and said interior surface having a plurality of serrations formed thereon, said interior surface also having a pair of inclined ramp surfaces adjacent said other of said pair of leg portions, said one leg portion adapted to be inserted between said transparent member and said gasket such that said exterior surface engages said transparent member and said serrations engage said gasket.

2. The fastener clip of claim 1 wherein said one of said leg portions is formed with a tapered free edge.

3. The fastener clip of claim 1 wherein said fastener component is a male snap fastener which includes an annular, tapered side wall and a top wall, said top wall being substantially parallel to at least an outer surface of said other of said leg portions.

4. The snap fastener of claim 3 wherein said top wall is substantially parallel to inner and outer surfaces of said other of said leg portions.

5. A boat windshield assembly comprising:
a transparent member;
at least one trim piece extending along an upper edge of said transparent member;
an elongated gasket secured within said trim piece and enclosing said upper edge of said transparent member; and
at least one fastener clip having a pair of mounting legs arranged obliquely relative to each other, said mounting legs engaging only said gasket and said transparent member.

6. The assembly of claim 5 wherein one of said legs comprises a base portion which supports a male snap fastener.

7. The assembly of claim 6 wherein the other of said fastener legs includes an outer flat surface and an inner serrated surface, said flat surface engaging said transparent member and said serrated surface engaging said gasket.

8. The assembly of claim 6 wherein said fastener clip and said male snap fastener is constructed of thermoplastic material.

9. The assembly of claim 6 wherein said fastener clip, said male snap fastener and said gasket have substantially the same color.

10. The assembly of claim 6 wherein said fastener legs are arranged in a substantial V-shape and have an angle of at least about 45° therebetween, with one of the legs having a length greater than the other of said legs.

11. The assembly of claim 10 wherein said male snap fastener includes an annular side wall and a top wall, said annular side wall having a portion which at least partially bridges an interface between said pair of fastener legs.

12. The assembly of claim 5 wherein said fastener legs are arranged in a substantial V-shape, with one of the legs having a length greater than the other of said legs.

13. The assembly of claim 5 wherein said transparent member is glass.

14. The assembly of claim 5 wherein said transparent member is acrylic.

15. A boat windshield assembly comprising:
a transparent member;
at least one trim piece extending along an upper edge of said transparent member;
an elongated gasket secured within said trim piece and enclosing said upper edge of said transparent member; and
at least one fastener clip secured to said windshield assembly along said gasket material between said transparent member and said trim piece, the fastener clip having an exposed portion which nowhere engages said trim piece; and wherein said exposed portion supports a male snap fastener component.

16. The assembly of claim 15 wherein the gasket material, said fastener clip and said male snap fastener component are constructed of material of the same color.

17. The assembly of claim 16 wherein said color is black.

18. The assembly of claim 15 wherein said transparent member is glass.

19. The assembly of claim 15 wherein said transparent member is acrylic.

20. A fastener clip comprising a pair of leg portions arranged in a substantial V-shape, one of said pair of leg portions having a length greater than the other of said pair of leg portions, the other of said leg portions integrally supporting a male snap fastener projecting away from said one of said leg portions, and wherein said one leg portion is formed with opposed interior and exterior surfaces, said exterior surface being substantially flat and said interior surface having a plurality of serrations formed thereon, and further wherein said male snap fastener includes an annular side wall and a top wall said annular side wall having a portion which bridges said pair of fastener legs.

* * * * *